(12) United States Patent 
Agarawal et al.

(10) Patent No.: US 12,120,413 B2
(45) Date of Patent: Oct. 15, 2024

(54) METHOD AND DEVICE FOR CAPTURING AN IMAGE BY CONFIGURING INTERNET OF THINGS (IoT) LIGHT DEVICES IN A IoT ENVIRONMENT

(71) Applicant: SAMSUNG ELECTRONICS CO., LTD., Suwon-si (KR)

(72) Inventors: Pulkit Agarawal, Noida (IN); Gaurav Kumar Tiwary, Noida (IN); Manali Arora, Noida (IN); Abhay Sharma, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 17/665,992

(22) Filed: Feb. 7, 2022

(65) Prior Publication Data

US 2023/0040269 A1 Feb. 9, 2023

Related U.S. Application Data

(63) Continuation of application No. PCT/KR2021/017338, filed on Nov. 24, 2021.

(30) Foreign Application Priority Data

Aug. 2, 2021 (IN) .............................. 202141034629

(51) Int. Cl.
*H04N 23/56* (2023.01)
*H04N 23/661* (2023.01)
(Continued)

(52) U.S. Cl.
CPC ........... *H04N 23/56* (2023.01); *H04N 23/661* (2023.01); *H05B 45/10* (2020.01); *H05B 47/155* (2020.01); *H05B 47/19* (2020.01)

(58) Field of Classification Search
None
See application file for complete search history.

(56) References Cited

U.S. PATENT DOCUMENTS 9,288,371 B2   3/2016   Ganesh et al.
9,313,863 B2   4/2016   Hershberg et al.
(Continued)

FOREIGN PATENT DOCUMENTS

CN    108495056 A    9/2018
IN    201941053751 A    6/2021
(Continued)

OTHER PUBLICATIONS

"Three-point lighting", Nov. 18, 2014, 2 pages https://en.wikipedia.org/wiki/Three-point_lighting.
(Continued)

*Primary Examiner* — Quan Pham
(74) *Attorney, Agent, or Firm* — Sughrue Mion, PLLC

(57) ABSTRACT

A method by an electronic device is provided. The method includes identifying, by the electronic device, brightness information corresponding to each of a plurality of Internet of Things (IoT) light devices, categorizing, by the electronic device, the plurality of IoT light devices into at least one category based on the brightness information of each IoT light device of the plurality of IoT light devices and location information of each IoT light device of the plurality of IoT light devices, receiving, by the electronic device, a user input selecting a lighting effect from a plurality of lighting effects and an effect level, and updating, by the electronic device, information on the at least one category of the plurality of IoT light devices based on the lighting effect, the effect level and the brightness information.

17 Claims, 26 Drawing Sheets

(51) Int. Cl.
    *H05B 45/10*     (2020.01)
    *H05B 47/155*     (2020.01)
    *H05B 47/19*     (2020.01)

(56) References Cited

U.S. PATENT DOCUMENTS

| | | |
|---|---|---|
| 10,462,340 B2 | 10/2019 | Mishra et al. |
| 10,574,876 B2 | 2/2020 | Pincenti et al. |
| 11,044,414 B2 | 6/2021 | Kim et al. |
| 2011/0211110 A1 | 9/2011 | Doublet |
| 2013/0271004 A1 | 10/2013 | Min et al. |
| 2014/0160307 A1 | 6/2014 | Ganesh et al. |
| 2014/0168459 A1* | 6/2014 | Spielberg ............... H04N 23/66 348/222.1 |
| 2014/0188985 A1 | 7/2014 | Park et al. |
| 2014/0198232 A1 | 7/2014 | Rolston |
| 2019/0058822 A1 | 2/2019 | Ryu et al. |
| 2019/0188913 A1 | 6/2019 | Cho et al. |
| 2019/0340306 A1 | 11/2019 | Harrison et al. |
| 2019/0362560 A1 | 11/2019 | Choi et al. |
| 2019/0394383 A1 | 12/2019 | Kim et al. |
| 2020/0170086 A1* | 5/2020 | Trim ...................... H05B 47/19 |
| 2020/0265647 A1* | 8/2020 | Cho ........................ G06F 3/011 |
| 2020/0326837 A1 | 10/2020 | Ni |

FOREIGN PATENT DOCUMENTS

| | | |
|---|---|---|
| IN | 202121025261 A | 7/2021 |
| KR | 1020170024277 A | 3/2017 |
| KR | 102191441 B1 | 12/2020 |
| KR | 10-2021-0012777 A | 2/2021 |

OTHER PUBLICATIONS

"NXP Introduces Secure UWB Fine Ranging Chipset to Allow Broad Deployment in Mobile Devices", Sep. 17, 2019, 3 pages https://investors.nxp.com/news-releases/news-release-details/nxp-introducessecure-uwb-fine-ranging-chipset-allow-broad/.

Harman, G., "Getting Started With Three Point Lighting", Jun. 24, 2020, 6 pages https://offshoot.rentals/content/getting-started-with-three-point-lighting.

International Search Report (PCT/ISA/210) issued May 2, 2022 by the International Searching Authority in counterpart International Application No. PCT/KR2021/017338.

Written Opinion (PCT/ISA/237) issued May 2, 2022 by the International Searching Authority in counterpart International Application No. PCT/KR2021/017338.

Communication dated Mar. 26, 2024, issued by Intellectual Property India in Indian Application No. 202141034629.

Extended European Search Report dated Jul. 8, 2024, issued by the European Patent Office in European Application No. 21952947.6.

* cited by examiner

ISO-100
Shutter-1/40

ISO-100
Shutter-1/80

ISO-100
Shutter-1/20

METHOD AND DEVICE FOR CAPTURING AN IMAGE BY CONFIGURING INTERNET OF THINGS (IoT) LIGHT DEVICES IN A IoT ENVIRONMENT

CROSS-REFERENCE TO RELATED APPLICATION(S)

This application is a bypass continuation of International Application No. PCT/KR2021/017338, filed on Nov. 24, 2021 in the Korean Intellectual Property Office, which is based on and claims priority to Indian Patent Application No. 202141034629, filed on Aug. 2, 2021 in the Intellectual Property Office of India, the disclosures of which are incorporated by reference herein in their entireties.

BACKGROUND

1. Field

The disclosure relates generally to image capturing and, more specifically, to a method and an electronic device for updating information on Internet of Things (IoT) light devices in an IoT environment for creating a lighting effect while capturing an image using the electronic device.

2. Description of the Related Art

While capturing images using an electronic device (e.g., a mobile device), different camera settings can be applied by a user of the electronic device, where the camera settings includes lighting effect settings on a scene in a field of preview (FOV) of a camera in the electronic device.

However, when the light effect settings are changed or applied on the scene in the FOV, an overall scene exposure and color tone is changed. Further, position of highlights and shadows cannot be changed for a scene by changing the light effect settings.

FIGS. 1A, 1B, 1C and 1D are diagrams illustrating a configuration for changing lighting effects and the results obtained from the lighting effects.

FIG. 1A shows different configurable camera settings for adjustment of lighting effects on the scene in the FOV. The configurable camera settings includes an ISO, a shutter speed, a Focus Mode, an exposure value (EV), and a White Balance (WB).

FIGS. 1B-1D the effect on the scene due to different values of the shutter speed. For FIG. 1B the shutter speed is $\frac{1}{40}$, in FIG. 1C, the shutter speed is $\frac{1}{80}$ and in FIG. 1D, the shutter speed is $\frac{1}{20}$.

As seen in FIGS. 1B-1D, the effect of the change in the shutter speed is applied to the whole scene. In case the user intends for the right side of the scene to be illuminated, there is no option for the user to do so. Since the position of highlights and shadows cannot be changed for parts of the scene, there is no way to apply directional lighting to the scene in indoor photography.

To solve the problem of achieving conditional lighting while capturing an image, there is currently provided external devices/system. These external lighting devices often referred to as smartphone lighting accessories are widely used by social media influencers. The lighting accessories are portable and have become a mainstream smartphone photography product. However, the lighting accessories are costly.

FIGS. 2A and 2B show external lighting devices being used by the user while capturing the image.

As seen in FIG. 2A, 100 is the external lighting device being used by a user 102 of the electronic device 104. The user 102 has to utilize the external lighting device 100 in order to achieve the conditional lighting effect as the electronic device does not provide any configuration which results in conditional lighting. Thus the user has to pay additional amount to get the desired lighting effect.

FIG. 2B shows various external lighting devices.

Software based options for achieving conditional lighting may be utilized, however the conditional lighting effect is achieved after the image is captured.

The disadvantage with the software based method is that the final picture looks artificial because the overall effect created in not as real to the effect created using real lighting. A professional photographer can easily identify that the created effect is artificial and lacks realism Thus, it is necessary to provide a method and device for achieving conditional lighting while capturing the image and without using nay external lighting devices.

SUMMARY

Provided is a method of capturing an image by an electronic device in an Internet of Things (IoT) environment including a plurality of IoT light devices connected to the electronic device. By using the IoT light devices for capturing image the user need not buy extra lighting accessories thereby saving money.

Further provided are method and electronic device for updating information on the IoT light devices in the IoT environment to obtain desired lighting effect while capturing a scene without use of additional lighting devices.

Additional aspects will be set forth in part in the description which follows and, in part, will be apparent from the description, or may be learned by practice of the presented embodiments.

In accordance with an aspect of the disclosure, a method by an electronic device may include launching, by the electronic device, a camera application, identifying, by the electronic device, brightness information corresponding to each of a plurality of Internet of Things (IoT) light devices, categorizing, by the electronic device, the plurality of IoT light devices into at least one category based on the brightness information of each IoT light device of the plurality of IoT light devices and location information of each IoT light device of the plurality of IoT light devices, receiving, by the electronic device, a user input selecting a lighting effect from a plurality of lighting effects and an effect level, updating, by the electronic device, information on the at least one category of the plurality of IoT light devices based on the lighting effect, the effect level and the brightness information, and obtaining, by the electronic device, an image of at least one subject based on the updated information on the at least one category.

The brightness information may include a maximum brightness level of the plurality of IoT light devices on the at least one subject.

The camera application may be launched in an IoT photo mode.

The at least one category may include at least one of a key light category, a fill light category, and a back light category.

Identifying the brightness information of each IoT light device may include identifying, by the electronic device, the at least one subject in a field of view of at least one image sensor associated with the camera application, identifying, by the electronic device, a distance of the at least one subject from the at least one image sensor, identifying, by the electronic device, each of the plurality of IoT light devices that illuminate light on the at least one subject in the field of view of the at least one image sensor, identifying, by the electronic device, a distance of each IoT light device that illuminate light on the at least one subject from the at least one image sensor and the at least one subject, identifying, by the electronic device, a direction of each IoT light device that illuminate light on the at least one subject with respect to the at least one image sensor and with respect to the at least one subject, obtaining, by the electronic device, a pre-defined maximum brightness level of each IoT light device of the plurality of IoT light devices, and identifying by the electronic device, an effective brightness level of each IoT light device that illuminate light on the at least one subject. The brightness information of each IoT light device that illuminates light on the at least one subject may include the effective brightness level of each IoT light device that illuminates light on the at least one subject.

Categorizing the plurality of IoT light devices into the at least one category may include categorizing, by the electronic device, a first set of IoT light devices present behind the at least one subject as back lights based on the identified direction of each IoT light device and the identified distance of each IoT light device of the plurality of IoT light devices, categorizing, by the electronic device, remaining IoT light devices of the plurality of IoT light devices in a second set of IoT light devices and a third set of IoT light devices, where the second set of IoT light devices and the third set of IoT light devices are in front of the at least one subject, and where the second set of IoT light devices are positioned opposite to the third set of IoT light devices, identifying, by the electronic device, a maximum cumulative effective brightness of the second set of IoT light devices and a maximum cumulative effective brightness of the third set of IoT light devices, identifying, by the electronic device, whether a difference between the maximum cumulative effective brightness of the second set and the maximum cumulative effective brightness of the third set is greater than a threshold difference, performing, by the electronic device, one of categorizing, the second set of IoT light device as key lights and the third set of IoT light device as fill lights in response to identifying that the difference between the maximum cumulative effective brightness of the second set and the maximum cumulative effective brightness of the third set is greater than the threshold difference, where the maximum cumulative effective brightness of the second set is greater than the maximum cumulative effective brightness of the third set, or categorizing, the second set of IoT light device as key lights and the third set of IoT light device as fill lights in response to identifying that the difference between the maximum cumulative effective brightness of the second set and the maximum cumulative effective brightness of the third set is less than the threshold difference, and where the at least one subject is facing towards the second set of IoT lights.

Receiving the user input may include displaying a plurality of lightning effects in a field of view of at least one imaging sensor of the electronic device, and identifying a desired lightning effect from the plurality of lightning effects selected by a user of the electronic device, where each lighting effect from the plurality of lighting effects has different ratios of brightness of each category of IoT lights.

The method may further include transmitting, by the electronic device, a control command to each IoT light device in the at least one category of the IoT light devices, where the control command includes values corresponding to a desired brightness level of the at least one category, receiving, by each IoT light device in the at least one category, the control command from the electronic device, and applying the control command to each IoT device in the at least one category to achieve the desired brightness level of the at least one category.

The plurality of IoT light devices may be in communication with the electronic device over a common network.

The method may further include identifying, by the electronic device, at least one of a change in a position of the at least one subject, and a change in position of an image sensor associated with the camera application of the electronic device, and re-configuring, by the electronic device, the at least one category of IoT light devices based on the identified at least one of the change in the position of the at least one subject and the change in position of the image sensor.

According to an aspect of the disclosure, an electronic device may include a memory storing instructions, a processor, and a communicator. The processor may be configured to execute the instructions to launch a camera application, identify brightness information corresponding to a plurality of IoT light devices, categorize the plurality of IoT light devices into at least one category based on the brightness information of each IoT light device of the plurality of IoT light devices and location information of each IoT light device of the plurality of IoT light devices, receive a user input selecting a lighting effect from a plurality of lighting effects and an effect level, update information on the at least one category of the plurality of IoT light devices based on the lighting effect, the effect level and the brightness information, and obtain an image of the at least one subject based on the updated information on the at least one category.

The brightness information may include a maximum brightness level of the plurality of IoT light devices on the at least one subject.

The processor may be further configured execute the instructions to launch the camera application to obtain the image of the at least one subject in an IoT photo mode. The IoT photo mode may configure the electronic device to achieve a desired brightness level of the at least one category.

The at least one category may include at least one of a key light category, a fill light category, and a back light category.

The processor may be further configured to execute the instructions to identify the at least one subject in a field of view of at least one image sensor associated with the camera application, identify a distance of the at least one subject from the at least one image sensor of the electronic device, identify each of the plurality of IoT light devices that illuminate light on the at least one subject in the field of view of the at least one image sensor, identify a distance of each IoT light device that illuminates light on the at least one subject and a direction of each IoT light device with respect to the at least one image sensor and with respect to the at least one subject, obtain a pre-defined maximum brightness level of each IoT light device that illuminate light on the at least on subject, and identify an effective brightness level of each IoT light device that illuminate light on the at least one subject.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
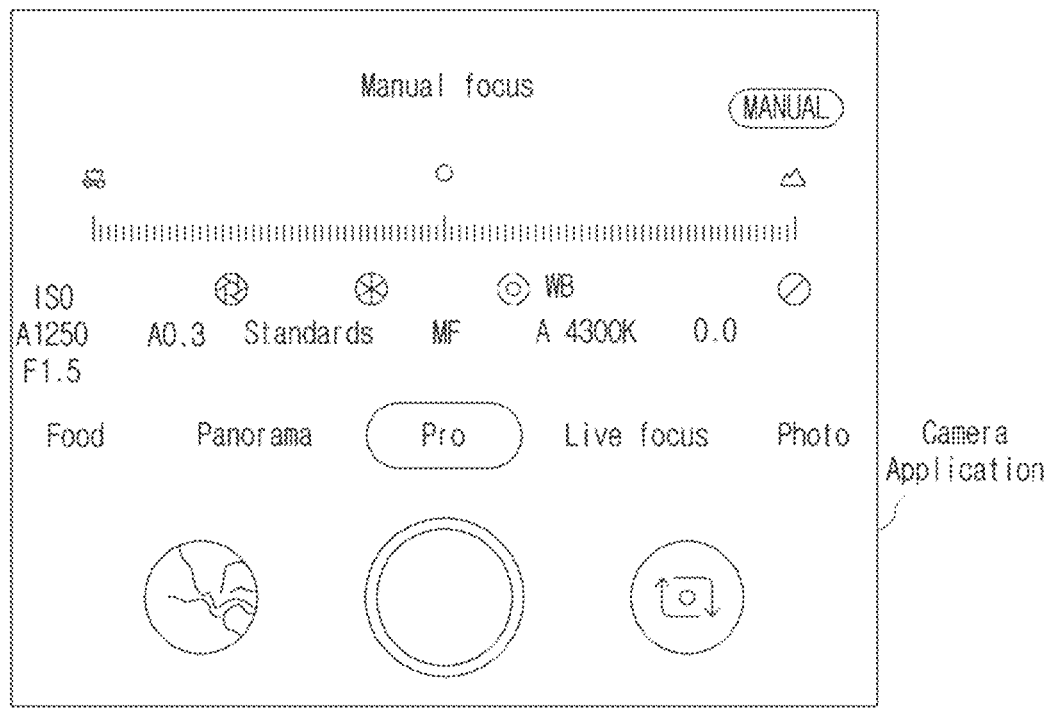
FIGS. 1A, 1B, 1C and 1D are diagrams illustrating a configuration for changing lighting effects and the results obtained from the lighting effects.
Figure 1B:
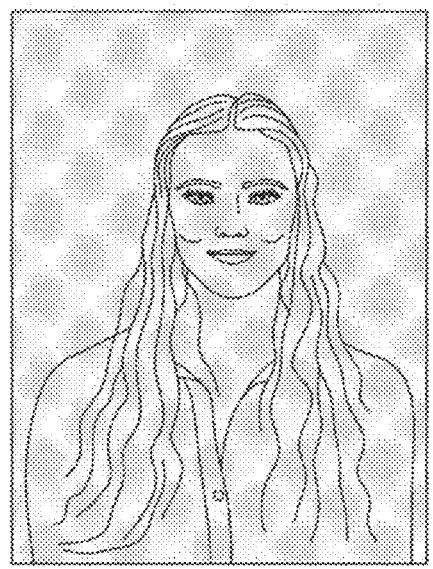
Figure 1C:
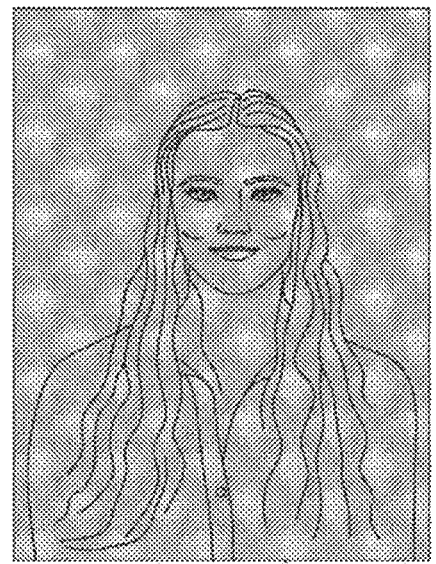
Figure 1D:
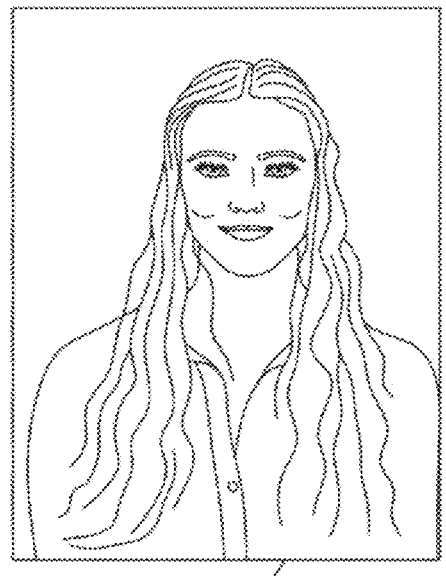
Figure 2A:
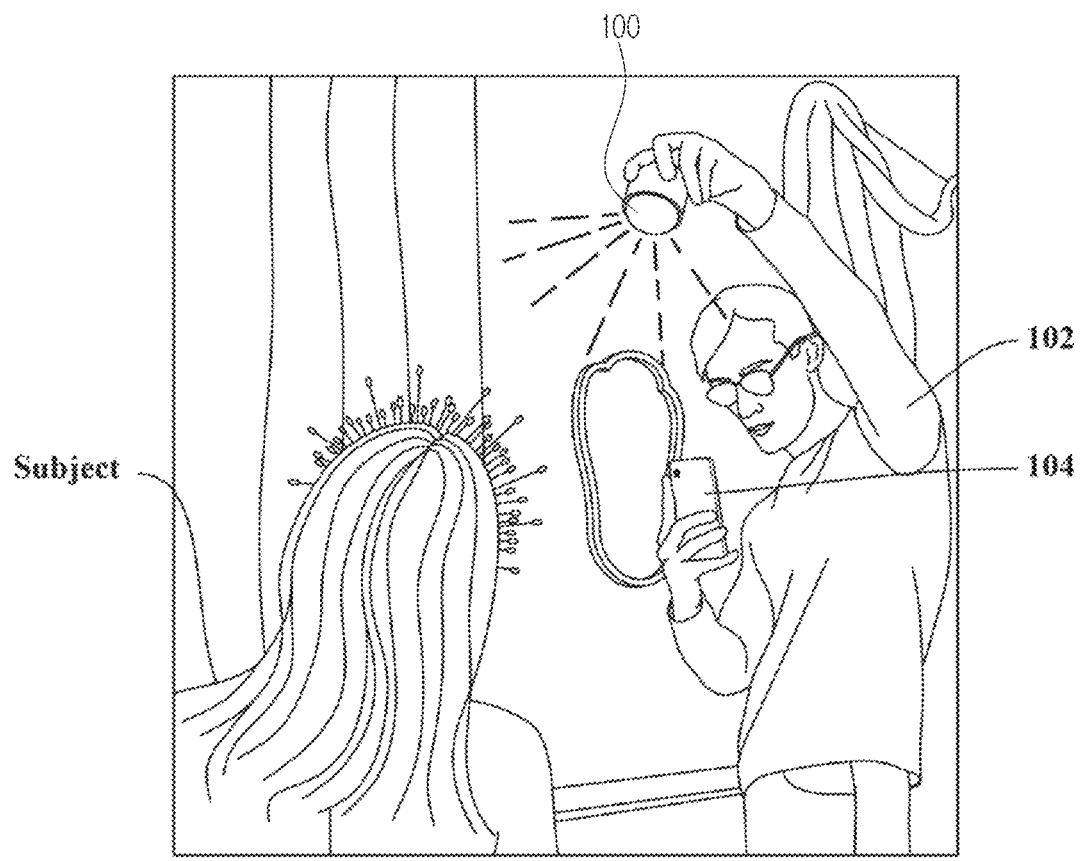
FIGS. 2A and 2B show external lighting devices being used by the user while capturing the image.
Figure 2B:
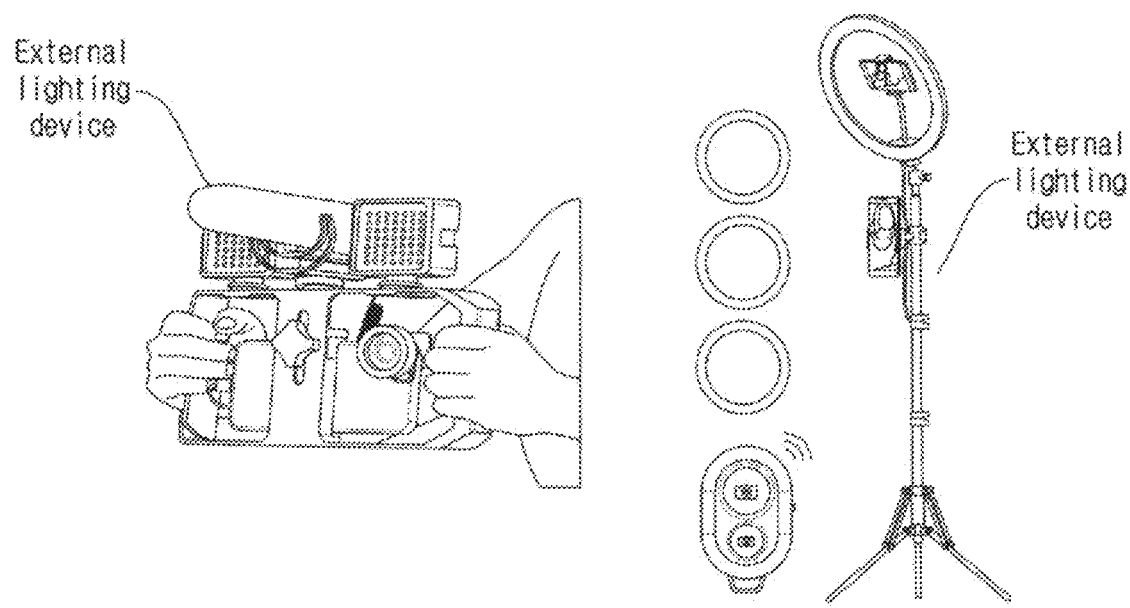

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide a method and an electronic device for a configuration of Internet of Things (IoT) light devices connected with the electronic device in an IoT environment and where the IoT light devices produce lighting effects while capturing image of a scene in a field of view (FOV) of a camera of the electronic device.

In an embodiment, the method may include determining maximum brightness level of each IoT light device on a subject in the FOV and categorizing the IoT light devices in the IoT environment into different categories. Based on the categorization, different lighting effects are generated and displayed to a user of the electronic device for capturing the image. Each lighting effect displayed to the user have a specific ratio in which the category of the IoT light device illuminates the subject. The user selects any one lighting effect having the specific ratio of illumination by the different categories of the IoT light or the user selects a custom lighting effect, where the user customizes the ratio of the illumination by the different categories of the IoT light on the subject.

Unlike existing methods and systems, the disclosed methods and electronic devices do not require any additional hardware or additional lighting for achieving conditional lighting while capturing the scene. The disclosed method and electronic device make use of available IoT light devices in a surrounding of the electronic device for achieving the conditional lighting effect.

The disclosed methods and electronic devices provide generating a three-point lighting system using the existing IoT light devices for capturing images.

Referring now to the drawings, and more particularly to FIGS. 3A through 10, where similar reference characters denote corresponding features consistently throughout the figures, there are shown preferred embodiments.

Figure 3A:
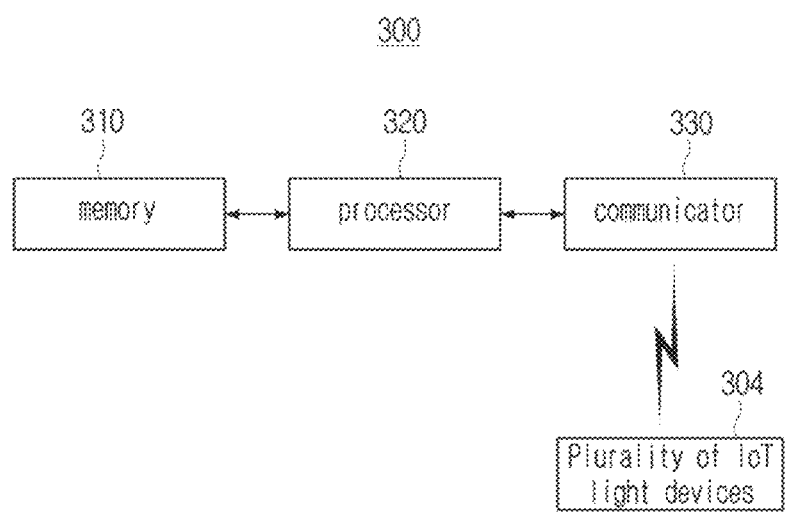
FIG. 3A is diagram illustrating operations of an electronic device according to an embodiment.

FIG. 3A is diagram illustrating operations of an electronic device according to an embodiment;

The memory 310 may include non-volatile storage elements. Examples of such non-volatile storage elements may include magnetic hard discs, optical discs, floppy discs, flash memories, or forms of electrically programmable memories (EPROM) or electrically erasable and programmable (EE-PROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 310 is non-movable. In some examples, the memory 310 can be configured to store larger amounts of information than the memory. In certain examples, a non-transitory storage medium may store data that can, over time, change (e.g., in Random Access Memory (RAM) or cache). The memory 310 can be an internal storage or it can be an external storage unit of the electronic device 300, a cloud storage, or any other type of external storage.

The processor 320 generally controls the operation of the electronic device 300.

In an embodiment, the processor 320 communicates with the memory 310 and the communicator 330. The processor 320 may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator 330 is configured for communicating internally between internal hardware components and with external devices via one or more networks. The communicator 330 includes an electronic circuit specific to a standard that enables wired or wireless communication.

For example, the communicator 330 may use communication methods such as Bluetooth (BT), wireless fidelity (Wi-Fi), Zigbee, infrared (IR), Ethernet, Serial Interface, Universal Serial Bus (USB), Mobile Industry Processor Interface Camera Serial Interface (MIPI CSI), Near Field Communication (NFC), Vehicle to Everything (V2X), and Cellular methods.

Here, the processor 320 launch a camera application 340 to identify brightness information corresponding to a plurality of IoT light devices 304, categorize the plurality of IoT light devices 304 into at least one category based on the brightness information of the each IoT light device and location information of each IoT light device, receive a user input selecting a lighting effect from a plurality of lighting effects and an effect level, update information on the at least one category of the IoT light devices 304 based on the lighting effect, the effect level and the brightness information and obtain the image of the at least one subject based on the information on the updated category.

The brightness information includes a maximum brightness level of the plurality of IoT light devices on the at least one subject.

The processor 320 may launch the camera application 340 to obtain the image of the at least one subject in the IoT environment 342 in an IoT photo mode, where the IoT photo mode configures the electronic device 300 to achieve the desired brightness level of the at least one category.

The at least one category includes at least one of a key light, a fill light, and a back light. Information on the updated category The processor 320 may identify the at least one subject in a field of view of at least one image sensor 342 associated with the camera application 340 of the electronic device 300, identify a distance of the at least one subject from the at least one image sensor 342 of the electronic device 300, identify the plurality of IoT light devices 304 illuminating light on the at least one subject in the field of view of the at least one image sensor 342 of the electronic device 300, identify a distance of each IoT light device and a direction of each IoT light device with respect to the at least one image sensor 342 of the electronic device 300 and with respect to the at least one subject, obtain a pre-defined maximum brightness level of each IoT light device and identify a effective brightness level of each IoT light device on the at least one subject.

Figure 3B:
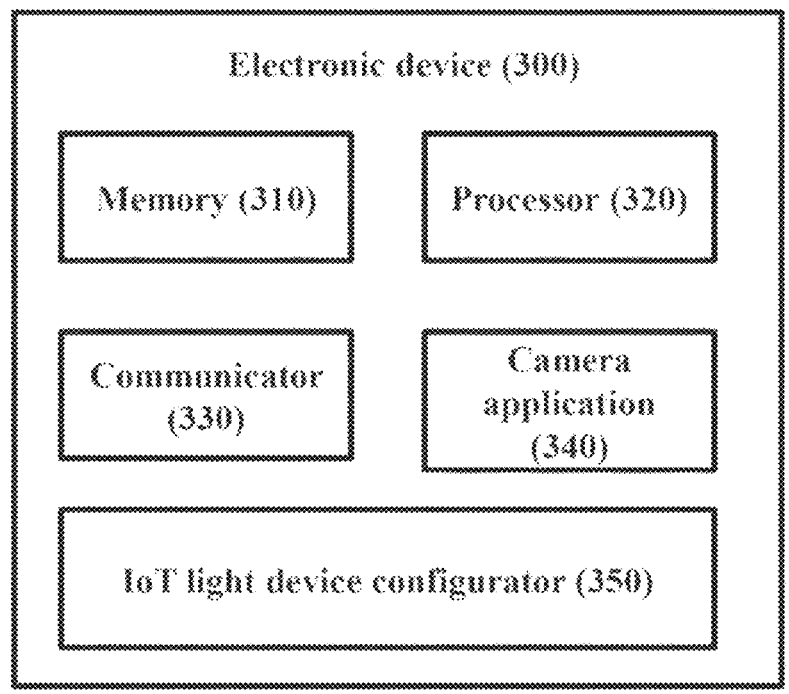
FIG. 3B is a diagram illustrating an electronic device for capturing an image in an Internet of Things (IoT) environment including a plurality of IoT light devices connected to the electronic device, according to an embodiment.

FIG. 3B is a diagram illustrating an electronic device for capturing an image in an IoT environment including a plurality of IoT light devices connected to the electronic device, according to an embodiment.

As seen in FIG. 3B, the electronic device 300 is present in an IoT environment 302 and is connected to different IoT light devices. The electronic device 300 is connected with the IoT light devices over a network in the IoT environment 302.

The electronic device 300 may be, for example, but not limited, to a mobile device, a cellular phone, a smart phone, a Personal Digital Assistant (PDA), a tablet computer, a laptop computer, an IoT device, an Artificial intelligent (AI) device or the like.

The IoT light devices are hereafter referenced by numeral 304. The IoT light devices 304 may be the smart lights which are controlled wirelessly over the network.

In an embodiment, the electronic device 300 includes a memory 310, a processor 320, a communicator 330, a camera application 340 and an IoT light device configurator 350.

The memory 310 stores instructions to be executed by the processor 320 for updating information on the IoT light devices 304 while capturing the image using the camera application 340. The memory 310 also stores information associated with the IoT light devices 304 such as a location of the IoT light devices 304, a brightness value of the IoT light devices 304 and the like. The memory 310 stores the image captured by the camera application 340

In an embodiment, the processor 320 communicates with the memory 310, the communicator 330, the camera application 340 and the IoT light device configurator 350. The processor 320 is configured to execute instructions stored in the memory 310 for updating information on the IoT light devices 304 while capturing the image using the camera application 340.

In an embodiment, the camera application 340 is responsible for capturing images. The camera application 340 is associated with a camera in the electronic device 300 and includes an image sensor 342. The camera application 340 is responsible for displaying various settings and/or configuration of the camera for capturing pictures of a scene in the FOV of the image sensor 342.

In yet another embodiment, the camera application 340 shows different lighting effects created due to different configuration of the IoT light devices 304. The camera application 340 also displays the scene in the FOV of the image sensor 342 with the different lighting effects applied. The camera application 340 determines a subject in the scene in the FOV of the image sensor 342.

The camera application 340 also determines a distance of each IoT light device 304 from the camera sensor 342 using various sensors present in the electronic device 300.

It is to be noted that the camera application 340 is not limited to performing the above described tasks, and in other embodiments, the camera application 340 may perform various other tasks.

The camera application 340 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the IoT light device configurator 350 is responsible for updating information on the IoT light devices 304 while capturing the image using the electronic device 300. Here, it may be assumed that the IoT light device configurator 350 can perform the operation of the electronic device 300 described as being performed by the processor 320 with reference to FIG. 3A.

The IoT light device configurator 350 detects the IoT light devices 304 surrounding the subject in the IoT environment 302. In an embodiment the IoT light devices 304 are communicating with the IoT light device configurator 350 over the network.

After detecting the subject and the IoT light devices 304, the IoT light device configurator 350 measures a distance of the IoT light devices 304 from the subject, a distance of the image sensor 342 from the subject and a distance of the IoT light devices 304 from the image sensor 342. In an embodiment, the distance between the IoT light devices 304 and the image sensor 342 is measured using UWB technology. In the UWB technology, one device act as a UWB pulse transmitter and another device act as a UWB pulse receiver. The time of flight concept is used for distance estimation of between transmitter and receiver.

In another embodiment, a direction between the IoT light device 304 and the image sensor 342 is measured using an angle of arrival (AoA) method.

In yet another embodiment, a distance between the IoT light device 304 and the subject is measured using normal mathematics.

The IoT light device configurator 350 obtains a value of the maximum brightness level of each IoT light device from the IoT light devices 304 from the network.

The maximum brightness level is a light vendor specific property of the individual IoT light device 304. This maximum brightness level concerns with the maximum supported illumination by the IoT light device 304 at the source.

In an embodiment, the information value of the maximum brightness level of each IoT light device may be obtained from a manufacturer of the IoT light devices 304. Based on the maximum brightness level of each IoT light device, the IoT light device configurator 350 determines a maximum effective brightness level of each IoT light device, where the maximum effective brightness level of the IoT light device is the maximum brightness level of the IoT light device on the subject.

Further, the IoT light device configurator 350 divides the IoT light devices 304 into three categories, such as the back lights, the fill lights and the key lights based on the maximum effective brightness level of each IoT light device and a location of each IoT light device with respect to the subject and with respect to the image sensor 342. The categorization of the IoT light devices 304 is explained in detail in the specification below.

After categorization, the IoT light device configurator 350 creates different lighting effects to be applied by the user while capturing the images and/or videos. The lighting effects are created such that each light effect has a different ratio in which the categories of the IoT light devices 304 are illuminated while capturing the scene. The creation of the different lighting effects is explained in detail in the specification below.

The IoT light device configurator 350 further receives an input from the user of the electronic device 300, where the user selects a desired lighting effect. Upon detecting the input from the user, the IoT light device configurator 350 configures the categories of the IoT light devices 304 by updating information on the IOT light devices 304 based on the selected lighting effect. In an embodiment, the IoT light device configurator 350 sends a command to each category IoT light devices for producing and/or illuminating the subject in the desired configuration.

The camera application 340 displays the scene with the selected lighting effect, where the lighting effect is created by the IoT light device 304 and further captures the scene with the lighting effect selected by the user.

The IoT light device configurator 350 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

Thus as seen above, the proposed method and the electronic device 300 updates information on the IoT light devices 304 present in a vicinity of the electronic device 300 to provide the lighting system while capturing the image, without any additional cost involved.

Although the FIG. 3B shows various hardware components of the electronic device 300, it is to be understood that other embodiments are not limited thereon. In other embodiments, the electronic device 300 may include less or more number components. Further, the labels or names of the components are used only for illustrative purpose and does not limit the scope of the disclosure. One or more components can be combined together to perform same or substantially similar function for updating information on the IoT light devices 304 in the IoT environment 302 including the electronic device 300 to provide the lighting system while capturing the image.

Figure 3C:
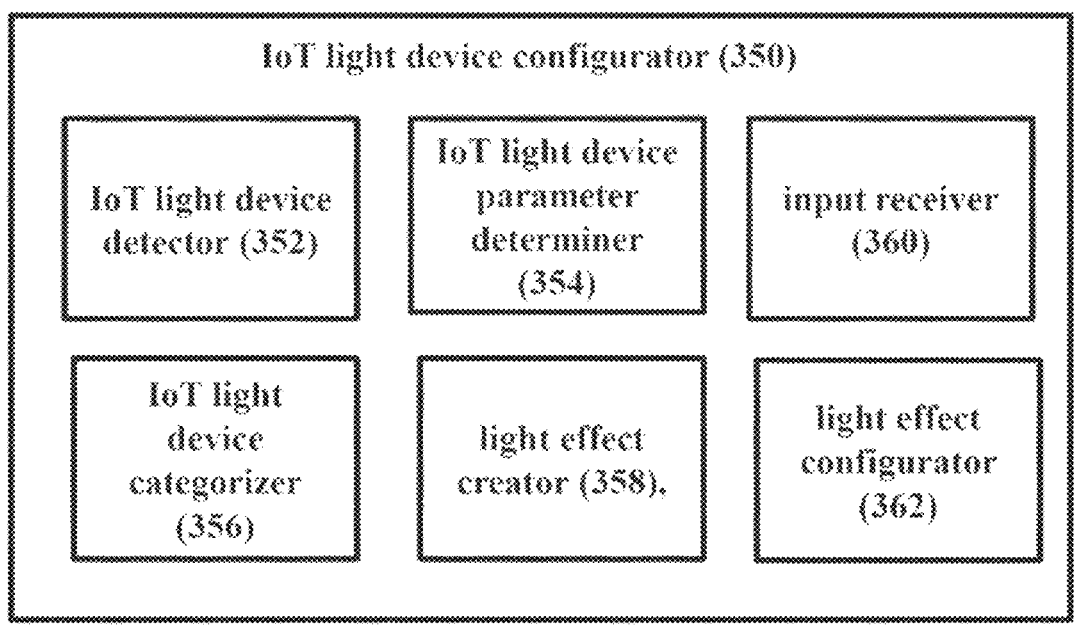
FIG. 3C is a block diagram illustrating an IoT light device configurator for updating information on the IoT light devices while capturing images, according to an embodiment.

FIG. 3C is a block diagram illustrating an IoT light device configurator for updating information on the IoT light devices while capturing images, according to an embodiment.

In an embodiment, the IoT light device configurator 350 includes an IoT light device detector 352, an IoT light device parameter determiner 354, an IoT light device categorizer 356, a light effect creator 358, an input receiver 360, and a light effect configurator 362.

In an embodiment the IoT light device detector 352 detects the IoT lights in the IoT environment 302. The IoT environment 302 includes a number of IoT device including the IoT light devices 304. All the IoT devices in the IoT environment 302 may communicate with each other over a common network or over a different network.

In an embodiment, each IoT light device from the IoT light devices 304 communicates with the communicator 330 of the electronic device 300 over the network and shares information such as a unique ID of each IoT light device, a maximum brightness level of each IoT light device and the like. Based on the information received by the communicator 330, the IoT light device detector 352 detects each IoT light device 304 surrounding the electronic device 300 and/or the camera sensor 342.

The IoT light device detector 352 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

Upon detecting the IoT light devices 304 surrounding the electronic device 300, the IoT light device parameter determiner 354 determines a location and the distance of each IoT light device from the subject and from the camera sensor 342 identified by the camera application 340. The IoT light device parameter determiner 354 determines the distance using different sensors present in the electronic device 300.

The IoT light device parameter determiner 354 also determines the maximum effective brightness of each IoT light device 304 on the subject. The maximum effective brightness each IoT light device 304 on the subject is calculated using the fundamental Inverse square law which says that the intensity of any wave is directly proportional to the inverse of square of distance from it.

The IoT light device parameter determiner 354 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

After determining the distance and the location of each IoT light device 304 from the subject, the IoT light device categorizer 356 divides the IoT light devices 304 into two classes such as a first class and a second class. The first class include the IoT light devices 304 which are in front of the camera sensor but behind the subject, whereas the second class includes all the IoT light devices which are in front of the subject. The first class of the IoT lights is termed as back lights.

The IoT light device categorizer 356 further categorizes the second class into two categories including a first set and a second set. The IoT light devices 304 in the second class categorized based on the maximum effective brightness of each IoT light device in the second class, the distance of each IoT light device from the subject and the distance of the each IoT light device from the camera sensor 342.

In an embodiment, the IoT light device categorizer 356 determines a cumulative effective brightness of the first set and the second set of IoT light devices 304. The cumulative maximum effective brightness of the first set is determined as sum of the maximum effective brightness of all the IoT light devices in the first set. Similarly, the cumulative maximum effective brightness of the second set is determined as sum of the maximum effective brightness of all the IoT light devices in the second set. The first set and the second set are opposite to each other.

Further, the IoT light device categorizer 356, compares the cumulative effective brightness of the first set and the second set of IoT light devices 304. A difference between the cumulative effective brightness of the first set and the second set of IoT light devices 304 is determined based on the comparison. The IoT light device categorizer 356 then determines whether the difference is greater or less than a pre-defined threshold difference.

In an embodiment, if the difference is greater than the pre-defined threshold difference then the IoT light device categorizer 356 categorizes the set of IoT light device as the key lights whose cumulative maximum effective brightness is greater.

In an embodiment, IoT light device categorizer 356 categorizes the first set of IoT light device as the key lights the and the second set of IoT light device as the fill lights in response to determining that the difference between the maximum cumulative effective brightness of the first set and the second set is greater than the pre-defined threshold difference and where the cumulative effective brightness of the first set is greater than the maximum cumulative effective brightness of the second set.

In another embodiment, IoT light device categorizer 356 categorizes the first set of IoT light device as the fill lights and the second set of IoT light device as the key lights in response to determining that the difference between the maximum cumulative effective brightness of the first set and the second set is greater than the pre-defined threshold difference and where the cumulative effective brightness of the first set is less than the maximum cumulative effective brightness of the second set.

In another embodiment, if the IoT light device categorizer 356 determines that the difference is less than the pre-defined threshold difference, then a direction of a face of the subject is determined. In an embodiment, if the direction of the face is towards the first set then the first set is categorized at the key lights and the second set is categorized at the fill lights. In another embodiment, if the direction of the face is towards the first second then the second set is categorized at the key lights and the first set is categorized at the fill lights. The first set and the second set may be opposite to each other.

The IoT light device categorizer 356 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

After categorizing the IoT light devices 304 into the back light, fill light and key light categories, the lighting effect creator 358 creates different lighting effect for use by the user. In an embodiment, the different lighting effects has different ratio in which the categories of the IoT light devices 304 are illuminated while capturing the scene. The different lighting effects are displayed to the user while capturing the image.

The lighting effect creator 358 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

The user selects the specific lighting effect while capturing the image. The user input is received by the user input receiver 360. The input receives upon receiving the selected lighting effects sends the information to the lighting effect configurator 362

The input receiver 360 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits maybe, for example, be embodied in one or more semiconductor chips, or on substrate supports such as printed circuit boards and the like.

The lighting effect configurator 362 sends command to the different categories of the IoT light device 304 for illuminating the subject in the specific ratio as described in the lighting effect. Further, the lighting effect configurator 362 sends command to each IoT light device for illuminating the scene in the desired configuration.

The above described at least one of the plurality of modules/components may be implemented through an AI model. The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/o may be implemented through a separate server/system.

The AI model may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning is a method for training a predetermined target device (e.g., a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3C shows various hardware components of the IoT light device configurator 350 is to be understood that other embodiments are not limited thereon. In other embodiments, the IoT light device configurator 350 may include less or more number of components. Further, the labels or names of the components are used only for illustrative purpose and does not limit the scope of the invention. One or more components can be combined together to perform same or substantially similar function to updating information on the IoT light devices 304 for creating the desired lighting system while capturing images.

Figure 4A:
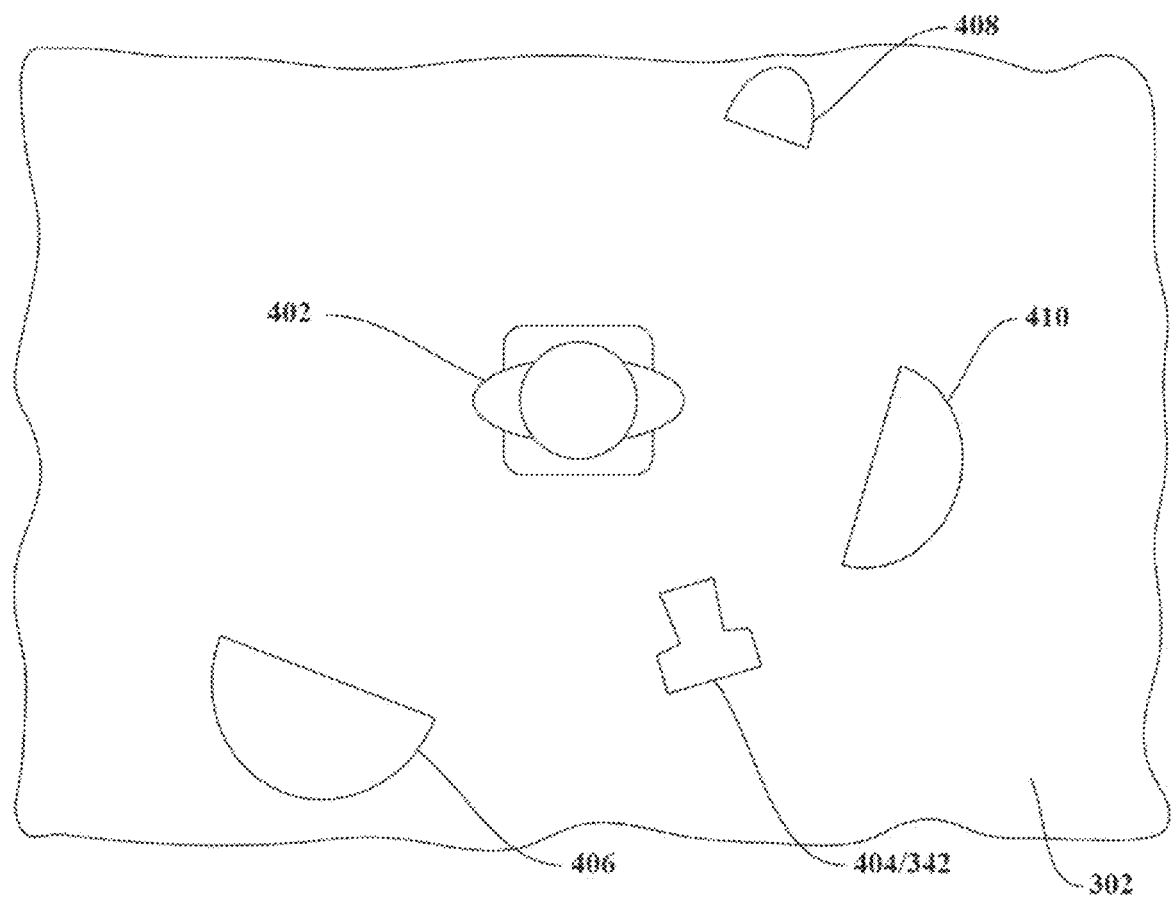
FIG. 4A is a diagram illustrating a three-point lighting system according to an embodiment.

FIG. 4A is a diagram illustrating a three-point lighting system according to an embodiment.

The three-point lighting system is may be utilized for capturing images as the three-point lighting system ensures proper and desired illumination while capturing images. In the present disclosure, the IoT light devices 304 in the IoT environment 302 are configured to create the three-point lighting system.

As seen in FIG. 4A, 402 is the subject, 404 is the camera or the camera sensor 342, 406 is the key light, 408 is the back light and 410 is the fill light. Since the back light 408 is placed behind the subject hence it is categorized as the back light. In another embodiment, the back light is also termed as the hair light. The back/hair light illuminates the space behind the subject such that the subject and a background of the subject appears separate.

Since the fill light 410 is placed beside the subject, it may be categorized as the side light. In another embodiment, the fill light is also termed as the side light. The side/fill light fills the harsh shadows created by the key light 406 such that the exposure is made even across the subject and is usually placed opposite to the key light 406 with intensity less than key light 406.

Since the light 410 is placed in front the subject, it may be categorized as the key light. In another embodiment, the key light is a primary light in the three-point lighting system and is positioned closer to 45° to the camera sensor 342. The key light the subject's face or a front portion while capturing images and/or videos.

Figure 4B:
FIG. 4B is a diagram illustrating different categories of the IoT light devices illuminating the subject according to an embodiment.

FIG. 4B is a diagram illustrating different categories of the IoT light devices illuminating the subject according to an embodiment. As seen in FIG. 4b, the different lines indicate the categories of the IoT light devices 304.

FIGS. 4C, 4D, 4E and 4F are diagrams illustrating the effect of the different categories of the IoT light devices on the subject according to an embodiment.

Figure 4C:
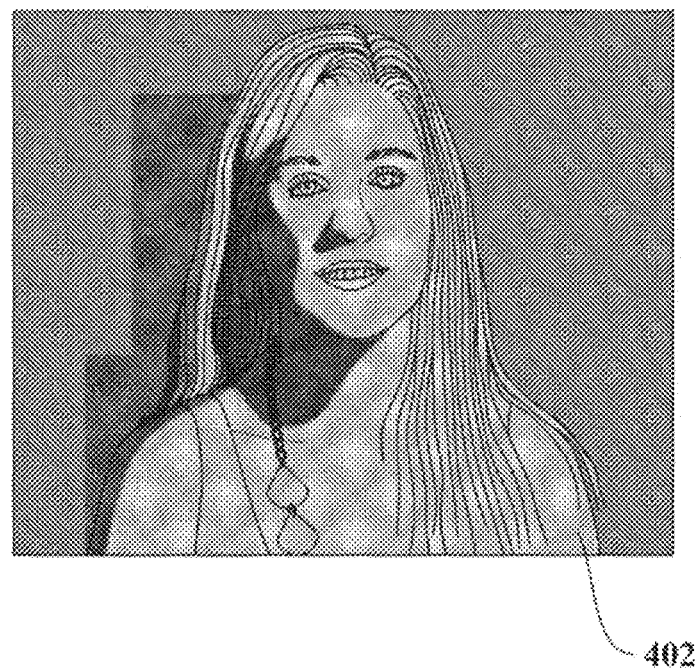
FIGS. 4C, 4D, 4E and 4F are diagrams illustrating the effect of the different categories of the IoT light devices on the subject according to an embodiment.

In FIG. 4C, only the key lights are illuminating the subject 402 and hence the front portion or the face of the subject is illuminated.

Figure 4D:
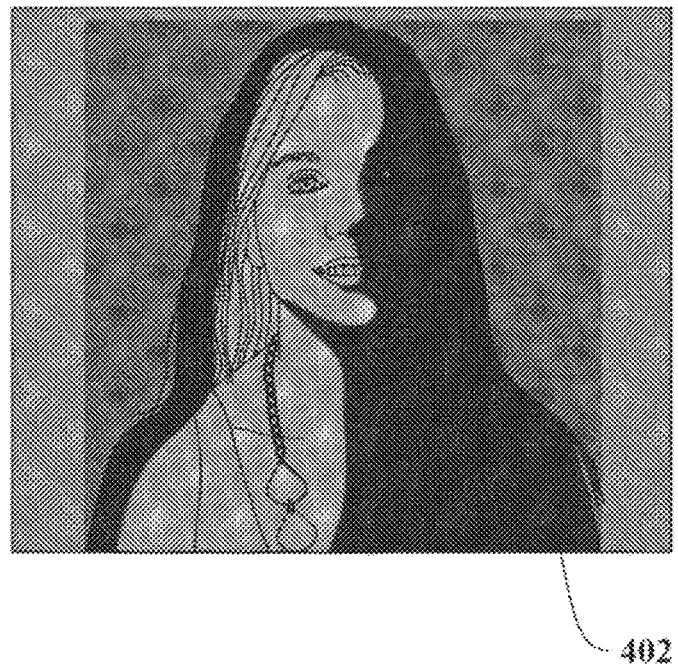

In FIG. 4D, only the fill lights are illuminating the subject 402 and hence the side portion the subject is illuminated.

Figure 4E:
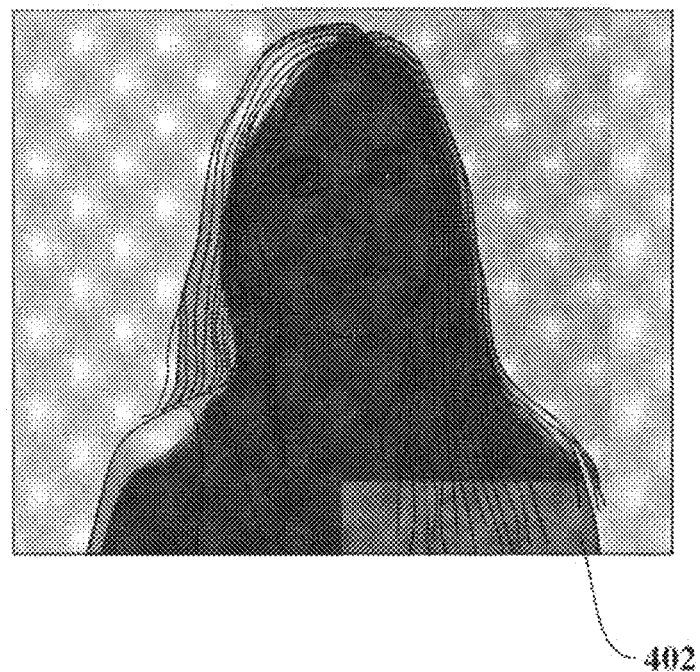

In FIG. 4E, only the back lights are illuminating the subject 402 and hence the back portion of the subject is visible.

Figure 4F:
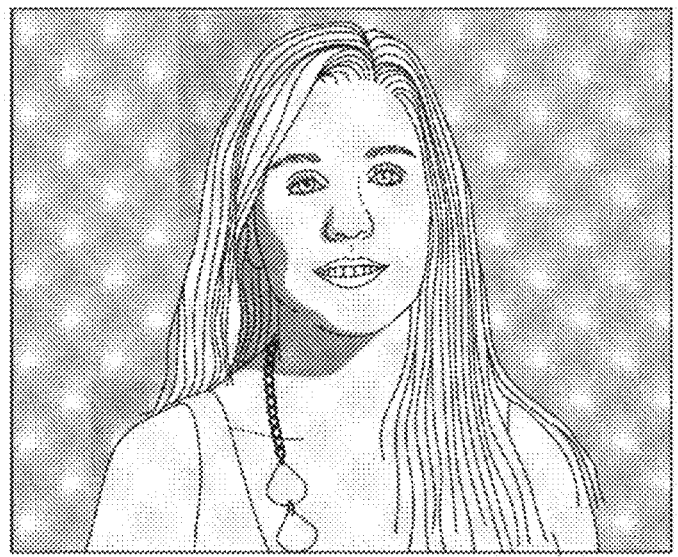

In FIG. 4F, all the IoT lights are illuminating the subject 402 and hence the complete scene is illuminated.

Figure 5A:
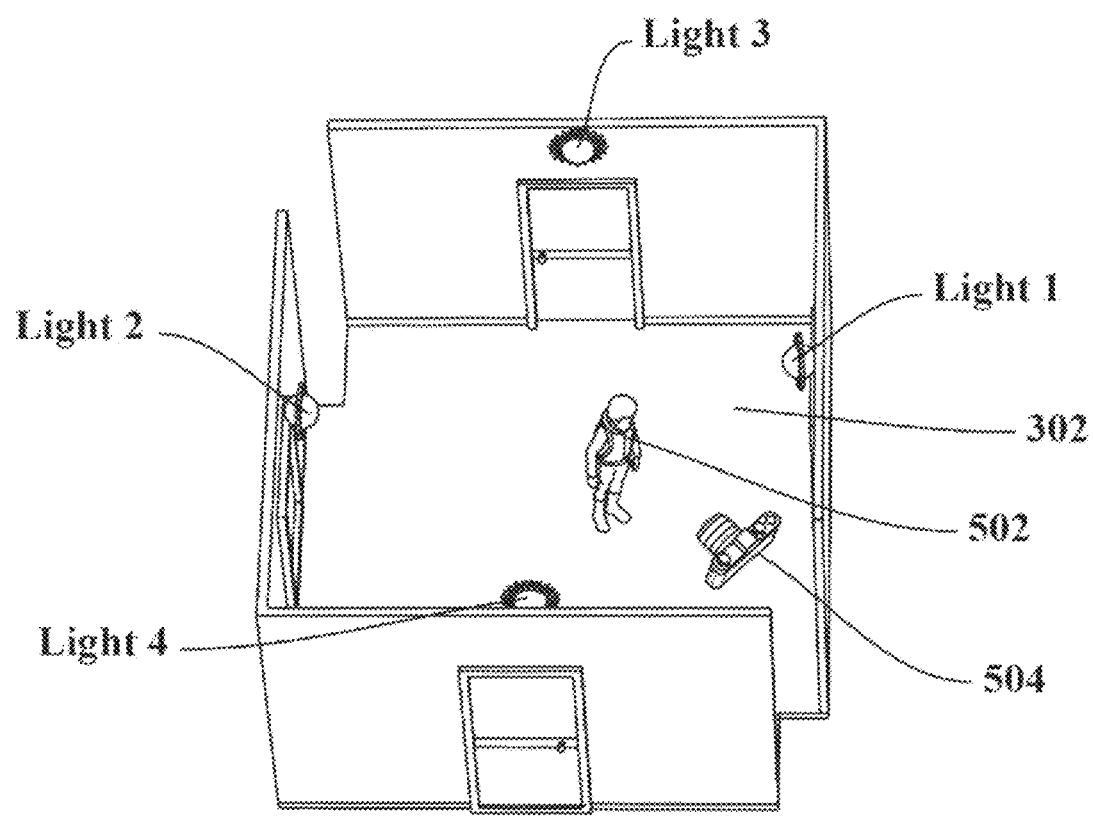
FIG. 5A is a diagram illustrating an example of the subject in the IoT environment with the IoT light devices according to an embodiment.

FIG. 5A is a diagram illustrating an example of the subject in the IoT environment with the IoT light devices according to an embodiment.

As seen in FIG. 5a, a subject 502 is in the IoT environment 302 including the IoT light devices 304 and a camera 504. The camera 504 may be a smart digital camera or a camera present in the electronic device. In the present example, there are 4 IoT light devices namely light 1, light 2, light 3 and light 4.

The subject 502 in the present embodiment is a human facing the camera 504. The light 4 and the light 1 are in front of the subject, whereas light 2 and light 3 are behind the subject. Since light 2 and light 3 are behind the subject these lights are categorized as back lights. Further, it is determined that the maximum effective brightness level (i.e., maximum brightness level on the subject 502) is greater for light 4 as compared to that of light 1 and hence light 4 is categorized at the key light and light 1 is categorized as the side light.

After categorizing the IoT light devices 304, the lighting effect creator 358 creates different lighting effects using the categorized IoT light devices 304.

In an embodiment, the lighting effect creator 358 creates some standard effects and a custom effect. The standard effects are the effects where the ratio of the illumination by the different categories of the IoT light on the subject is pre-defined. The custom effect is the effect where the user may change the ratio illumination by the different categories of the IoT light on the subject based on requirements. The examples of the standard effects include the following:

Dramatic EFFECT (Happy)

Key Light has higher ratio (High)+the Fill Light(Off)+Backlight(Off)+Key Light Color(Yellow)

Dramatic EFFECT (Suspense)

Key Light(High)+Fill Light(Off)+Backlight(Off)+Key Light Color(Blue) High Key Effect (Upbeat) Key Light (High)+Fill Light(High)+Backlight(High)+Key Light Color (Pure White)

Ideal Portrait Effect

Key Light(High)+Fill Light(Low)+Backlight(Low)

Silhouette Effect

Key Light(Off)+Fill Light(Off)+Backlight(High)

Each color has some basic emotion associated with it in photography. Thus, whatever the effect user has selected, different types of colors of light can add sub effects under the main effect category. In one example, the dramatic Effect is the main effect, but if it is used with the Yellow Color which signifies warmth, a sub effect of the Happy Dramatic Effect can be created if the Red color is used, which usually signifies rage and anger, a sub effect of the Angry Dramatic Effect and so on. Thus, colors will add another layer of emotion to the same main effects.

Table 1 below shows the different lighting effects created by the lighting effect creator 358 and the ratios of the different categories of light, according to an embodiment as disclosed herein.

TABLE 1

| Selected lighting Effect | Effect Brightness Requirement (Recommended ratios) | Effect Level* | Configured Values of Instantaneous Brightness |
|---|---|---|---|
| Drama Effect (Intense shadows due to absence of fill lights, suited for suspense or dramatic scenes) | Key:Fill:Back = 1:0:0 | 100% | $B_{key\text{-}instant} = B_{key\text{-}max}$ $B_{fill\text{-}instant} = B_{fill\text{-}min}$ $B_{back\text{-}instant} = B_{back\text{-}min}$ |
|  |  | X% | $B_{key\text{-}instant} = X\%$ of $B_{key\text{-}max}$ $B_{fill\text{-}instant} = B_{fill\text{-}min}$ $B_{back\text{-}instant} = B_{back\text{-}min}$ |
| High Key Effect (Flat picture with uniform lighting and reduced shadows suited for joyful scenes) | Key:Fill:Back = 1:1:1 | 100% | $B_{key\text{-}instant} = B_{key\text{-}max}$ $B_{fill\text{-}instant} = B_{key\text{-}instant}$ $B_{back\text{-}instant} = B_{key\text{-}instant}$ |
|  |  | X% | $B_{key\text{-}instant} = X\%$ of $B_{key\text{-}max}$ $B_{fill\text{-}instant} = B_{key\text{-}instant}$ $B_{back\text{-}instant} = B_{key\text{-}instant}$ |
| Portrait Effect (Slight shadows with bright key light and optional back light) | Key:Fill:Back = 2:1:1 | 100% | $B_{key\text{-}instant} = B_{key\text{-}max}$ $B_{fill\text{-}instant} = B_{key\text{-}instant}/2$ $B_{back\text{-}instant} = B_{key\text{-}instant}/2$ |
|  |  | X% | $B_{key\text{-}instant} = X\%$ of $B_{key\text{-}max}$ $B_{fill\text{-}instant} = B_{key\text{-}instant}/2$ $B_{back\text{-}instant} = B_{key\text{-}instant}/2$ |
| Silhouette Effect (Sharp back light effect to highlight the boundary of object) | Key:Fill:Back = 0:0:1 | 100% | $B_{fill\text{-}instant} = B_{fill\text{-}min}$ $B_{key\text{-}instant} = B_{fill\text{-}instant}$ $B_{back\text{-}instant} = B_{back\text{-}max}$ |
|  |  | X% | $B_{fill\text{-}instant} = B_{fill\text{-}min}$ $B_{key\text{-}instant} = B_{fill\text{-}instant}$ $B_{back\text{-}instant} = X\%$ of $B_{back\text{-}max}$ |

As seen in table 1, the effect brightness requirement column indicates the ratio in which the different categories of the IoT light devices 304 illuminate the subject.

Figure 5B:
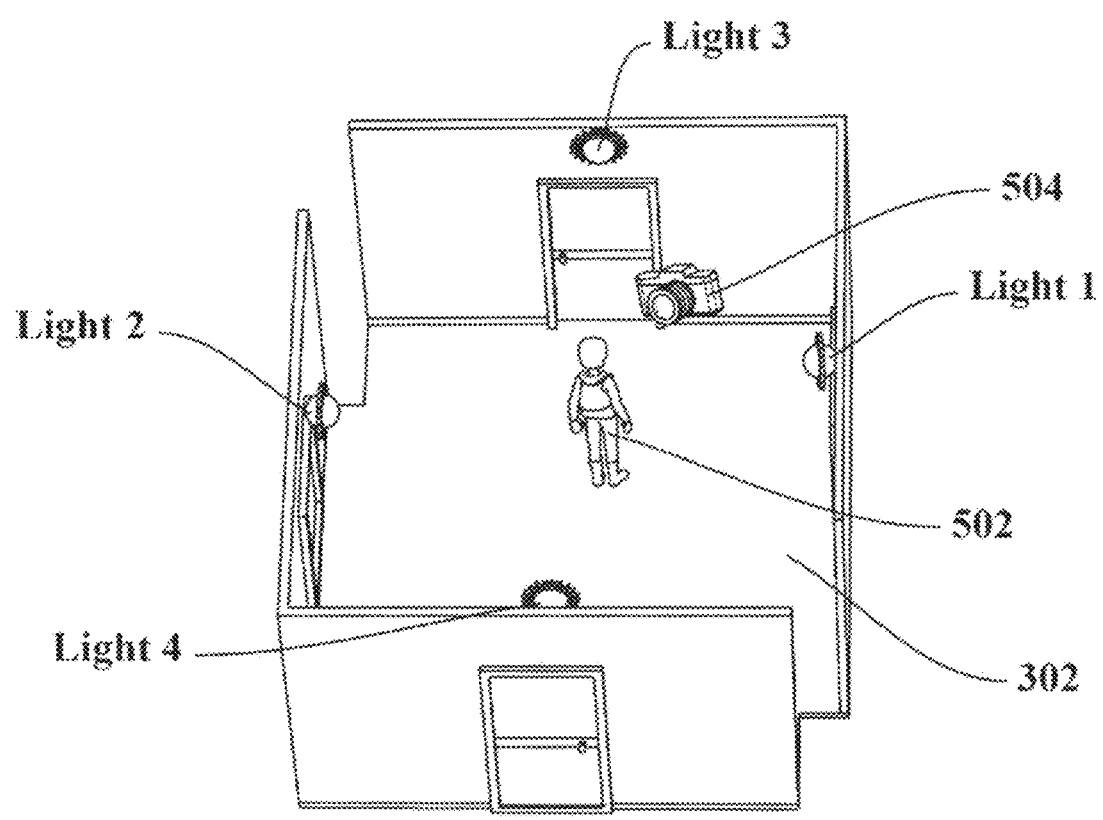
FIG. 5B is a diagram illustrating an example of a change in position of the subject in the IoT environment with the IoT light devices according to an embodiment.

FIG. 5B is a diagram illustrating an example of a change in position of the subject in the IoT environment with the IoT light devices according to an embodiment.

As seen in FIG. 5B, a position of the subject 502 is changed as compared to the position shown in FIG. 5a and hence the category of the IoT light devices 304 is also changed.

The light 3 and the light 1 are in front of the subject, whereas light 2 and light 4 are behind the subject. Since light 2 and light 4 are behind the subject these lights are categorized as back lights. Further, it is determined that the maximum effective brightness level (i.e., a maximum brightness level on the subject 502) is greater for light 3 as compared to that of light 1 and hence light 3 is categorized at the key light and light 1 is categorized as the side light.

In an embodiment, BKey-Instant is the instantaneous brightness value of the overall key light zone. It represents the effective brightness of whole key light zone on subject at a particular moment of photography and at a particular effect level. BKey-max is the maximum cumulative effective brightness of key light zone, considering the sum of maximum effective brightness of all bulbs in the key zone. Bfill-Instant is the instantaneous brightness value of the overall fill light zone. It represents the effective brightness of whole fill light zone on subject at a particular moment of photography and at a particular effect level. Bback-Instant is the instantaneous brightness value of the overall back light zone. It represents the effective brightness of whole back light zone on subject at a particular moment of photography and at a particular effect level. Bfill-max represents the maximum effective brightness of fill light zone. Conceptually it is always less than or equal to the BKey-Instant, because if it is more than BKey-Instant at any moment, it will violate the three-point lighting standard. So maximum possible brightness of fill light zone can never be greater than Instantaneous brightness of Key light zone. Bfill-min is the minimum brightness level of fill light zone. In most of the cases it is 0. Bback-min is the minimum brightness level of back light zone. In most of the cases it is 0. BKey-min represents the minimum brightness level of key light zone. It will always be greater than or equal to Bfill-Instant. This is because the minimum value of key light zone brightness cannot be less than the brightness level of fill light zone at any particular instant.

Thus, as seen in FIG. 5A and FIG. 5B, based on the change in position of the subject 502 the category of the IoT light devices 304 is also changed.

Figure 6A:
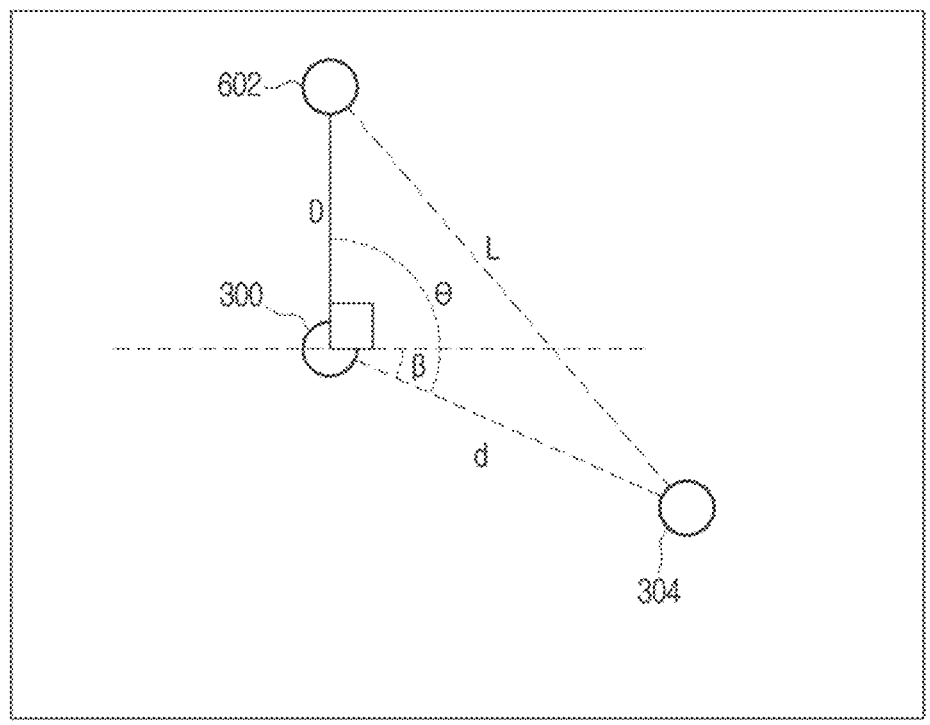
FIGS. 6A, 6B and 6C are diagrams illustrating example scenarios for categorization of the IoT light devices by measuring an angle and distance of the IoT light device from the subject and the camera sensor according to an embodiment.
Figure 6B:
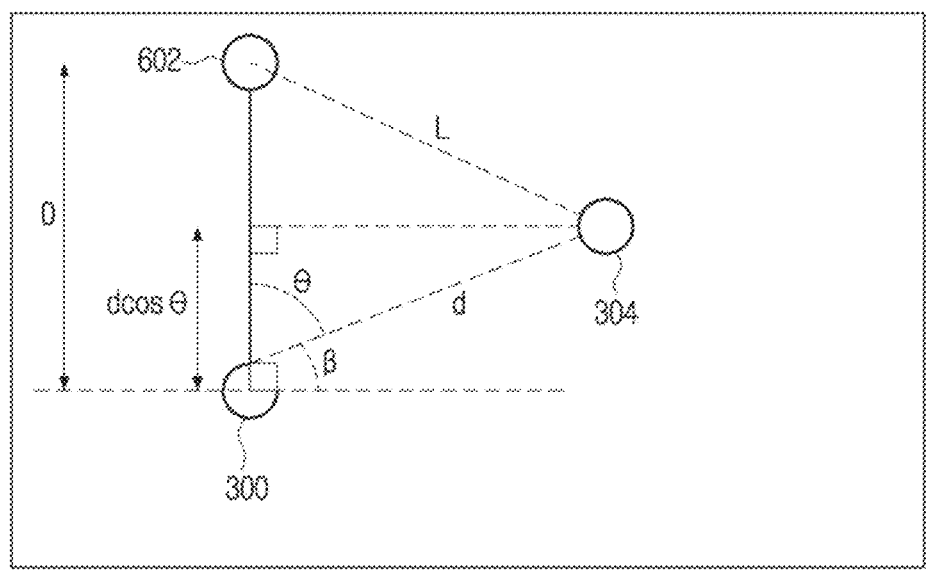
Figure 6C:
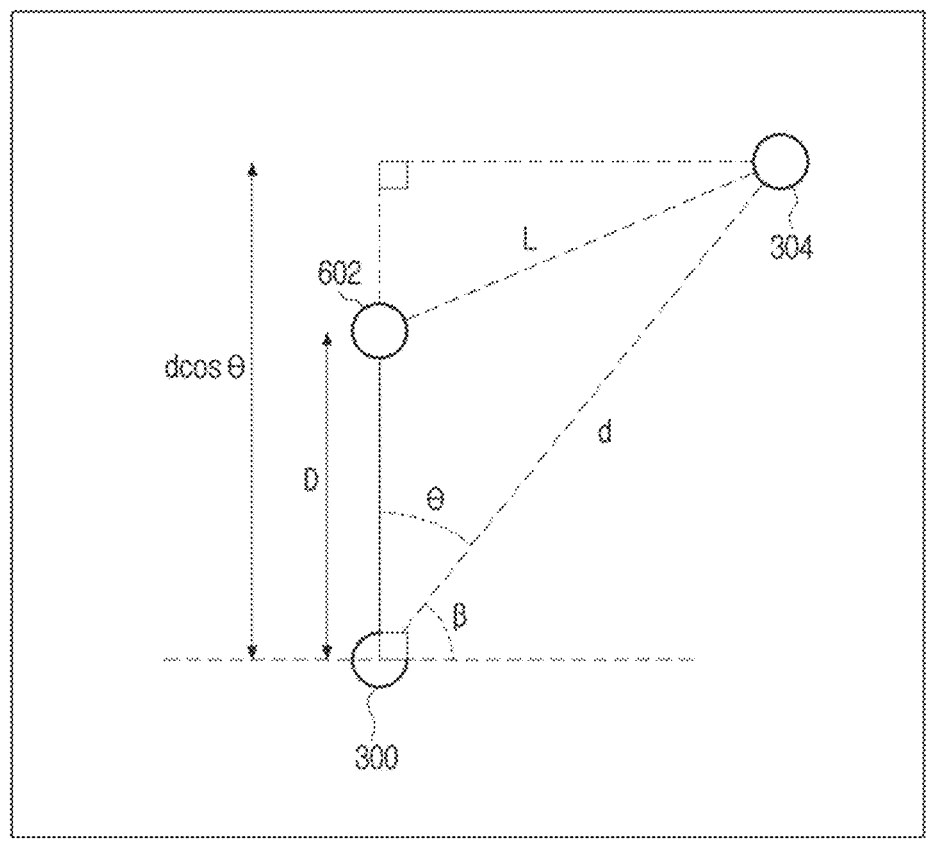

FIGS. 6A, 6B and 6C are diagrams illustrating example scenarios for categorization of the IoT light devices by measuring an angle and distance of the IoT light device from the subject and the camera sensor according to an embodiment.

In FIGS. 6A-6C, the electronic device 300 is Ultra Wide Band (UWB) enabled and includes a UWB pulse receiver. The IoT light device 304 is also UWB enabled and includes a UWB pulse transmitter. As seen in FIGS. 6A-6C, 602 is the subject and the camera in the electronic device 300 is capturing the subject 402. The UWB pulse transmitter sends a UWB signal to the UWB pulse receiver in the electronic device 300. From the UWB signal received, the UWB pulse receiver in the electronic device 300 determines an AoA of UWB signal. Using the AoA of the UWB signal, the electronic device 300 measures an angle between the IoT light device and the electronic device 300. Further, the distance between the subject 602 and the electronic device (camera) 300 is determined based on the UWB signal, where the subject 602 includes a UWB tag.

The distance of the subject and the camera may be measured using two different approaches. First, a time of flight (ToF) camera sensor may be used. ToF Sensors are a feature of modern smartphone cameras which calculate the time of flight of light signal to measure distance with subject. A ToF camera is a range imaging camera system employing time-of-flight techniques to resolve distance between the camera and the subject for each point of the image, by measuring the round trip time of an artificial light signal provided by a laser or an LED.

Second, a UWB tag may be used. A subject can hold UWB enabled Tag with himself while the picture is being clicked of him/her. In the second approach, in IoT photo mode the subject can simply hold UWB Tag or keep it in a pocket on himself and thereafter the system will do all distance/direction computations using UWB as underlying technology.

Figure 7:
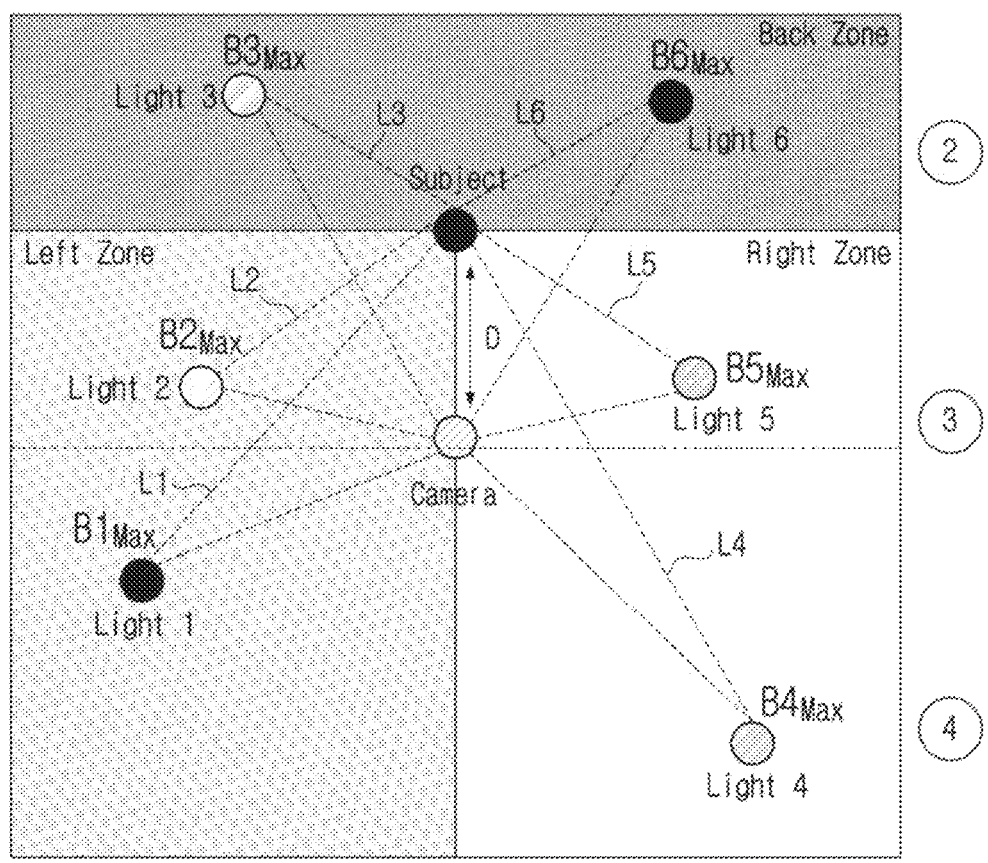
FIG. 7 is a diagram illustrating an example scenario for categorization of the IoT light devices based on the brightness information according to an embodiment.

FIG. 7 is a diagram illustrating an example scenario for categorization of the IoT light devices based on the brightness information according to an embodiment.

As seen in the FIG. 7, the IoT environment 304 may include six IoT light devices namely light 1, light 2, light 3, light 4, light 5 and light 6. Based on the maximum effective brightness of the IoT light devices 304 are categorized into back lights, fill lights and key lights.

Figure 8:
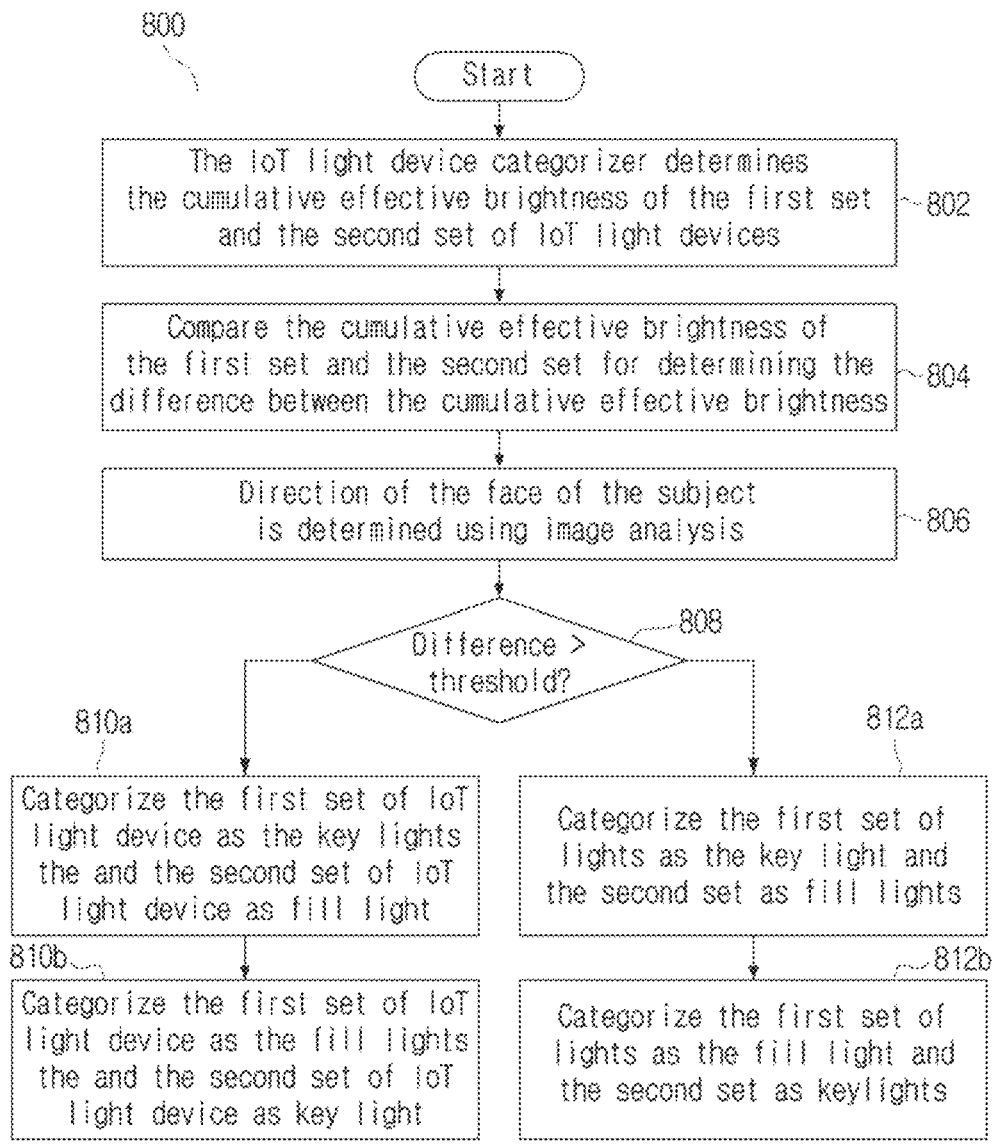
FIG. 8 is a flowchart for a method of categorization of fill lights and key lights categories according to an embodiment.

FIG. 8 is a flowchart 800 for a method of categorization of fill lights and key lights categories according to an embodiment.

Once the back lights are categorized the light device categorizer 356 categorizes the reaming IoT light in two categories including the first set and the second set.

In operation 802, the IoT light device categorizer 356 determines the cumulative effective brightness of the first set and the second set of IoT light devices 304. The cumulative maximum effective brightness of the first set is determined as sum of the maximum effective brightness of all the IoT light devices in the first set. Similarly, the cumulative maximum effective brightness of the second set is determined as sum of the maximum effective brightness of all the IoT light devices in the second set. The first set and the second set are opposite to each other.

Further, in operation 804, the IoT light device categorizer 356 compares the cumulative effective brightness of the first set and the second set of IoT light devices 304 for determining the difference between the cumulative effective brightness of the first set and the second set of IoT light devices 304 is determined based on the comparison.

In operation 806, the direction of the face of the subject is determined using image analysis.

In operation 808, the IoT light device categorizer 356 then determines whether the difference is greater or less than a pre-defined threshold difference.

In operation 810a, the IoT light device categorizer 356 categorizes the first set of IoT light device as the key lights the and the second set of IoT light device as fill light in response to determining that the maximum cumulative effective brightness of the first set is greater than the maximum cumulative effective brightness of the second set.

In another embodiment in operation 810b, the IoT light device categorizer 356 categorizes the first set of IoT light device as the fill lights the and the second set of IoT light device as key light in response to determining that the difference between the maximum cumulative effective brightness of the first set and the second set is greater than the pre-defined threshold difference and where the cumulative effective brightness of the first set is less than the maximum cumulative effective brightness of the second set.

In operation 812a, categorizes the first set of lights as the key light and the second set is categorized at the fill lights if the direction of the subject's face is towards the first set of light. In another embodiment, if the direction of the face is towards the second set, then the second set is categorized at the key light and the first set is categorized at the fill lights in operation 812b. The first set and the second set are opposite to each other.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

FIGS. 9A, 9B, 9C and 9D, are diagrams illustrating the result of the different lighting effects on the subject according to an embodiment.

Figure 9A:
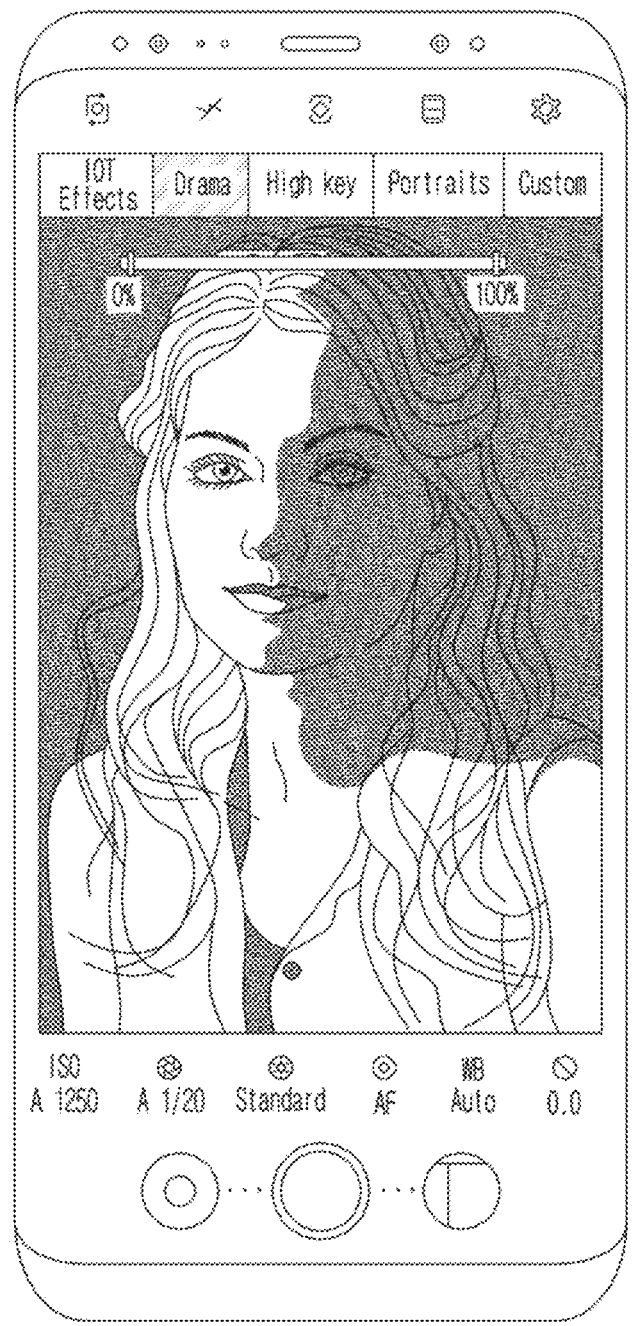
FIGS. 9A, 9B, 9C and 9D, are diagrams illustrating the result of the different lighting effects on the subject according to an embodiment.
Figure 9B:
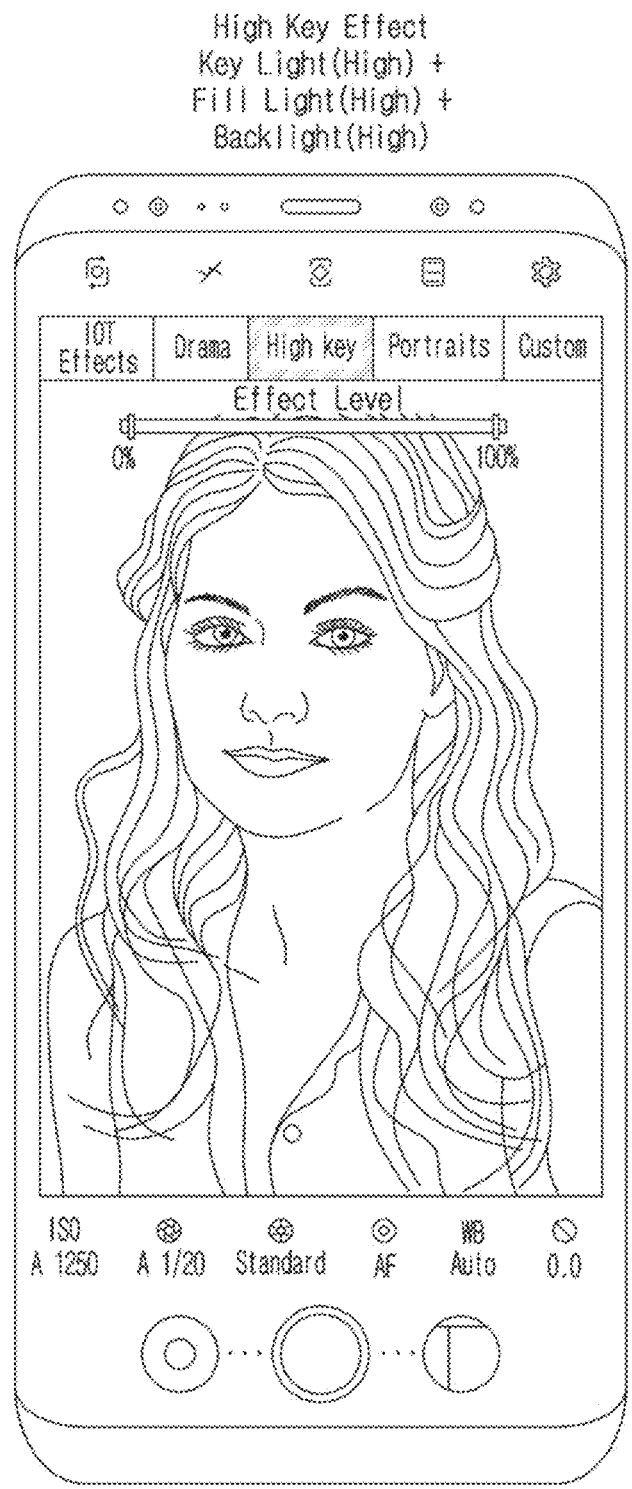
Figure 9C:
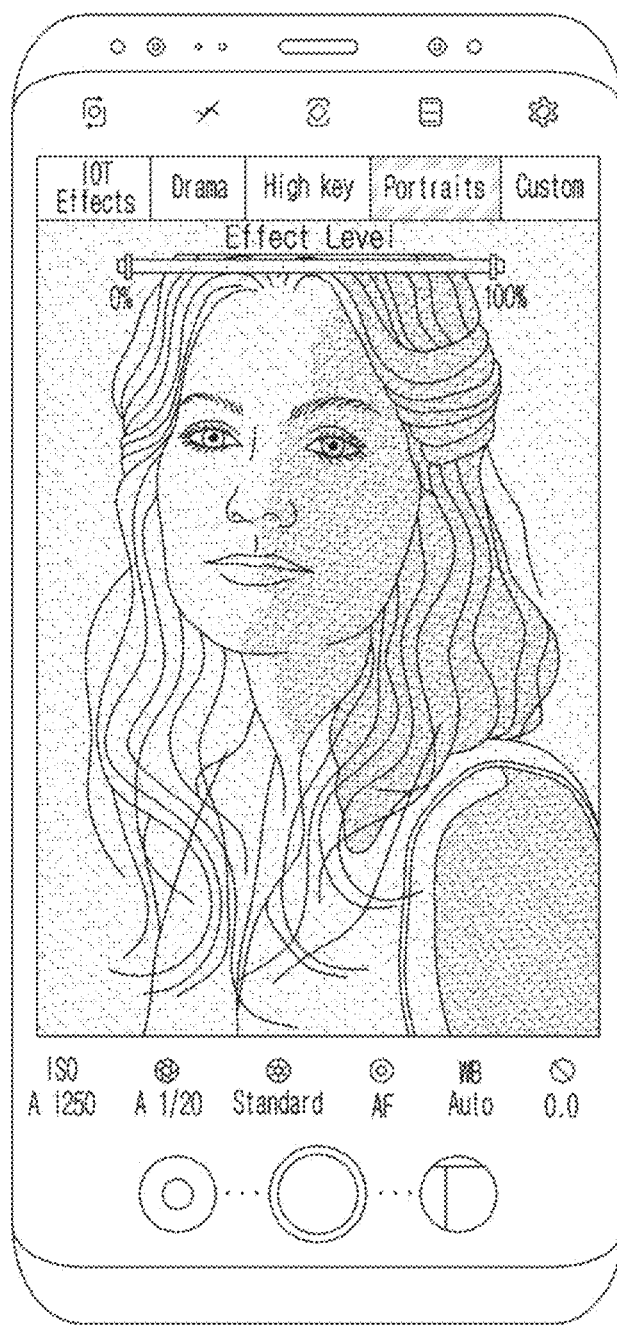
Figure 9D:
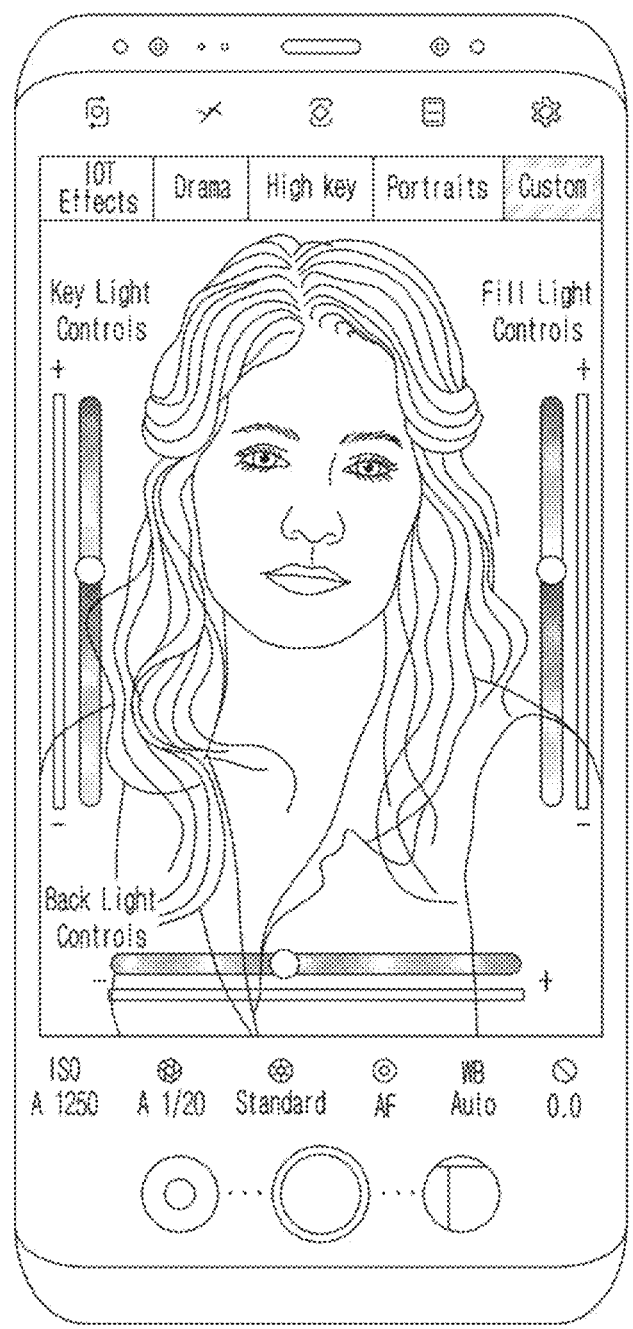

FIG. 9A shows the electronic device 300, where the camera application 340 shows the subject in the FOV of the camera sensor 342. As seen in FIG. 9A, the camera application 340 displays the different lighting effects for selection by the user and also the effect level. In FIG. 9A, the drama lighting effect is selected by the user. In FIG. 9B, the high key lighting effect is selected by the user. In FIG. 9C, the portrait lighting effect is selected by the user. In FIG. 9D, the custom lighting effect is displayed, where the user can customize the ratio of illumination on the subject by the different light categories.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

Forgoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method by an electronic device, the method comprising:
    launching, by the electronic device, a camera application;
    identifying, by the electronic device, brightness information corresponding to each of a plurality of Internet of Things (IOT) light devices;
    categorizing, by the electronic device, the plurality of IoT light devices into at least one category based on a maximum brightness level included in the brightness information of each IoT light device of the plurality of IoT light devices and location information of each IoT light device of the plurality of IoT light devices with respect to a location of a camera and with respect to a face of at least one subject;
    receiving, by the electronic device, a user input selecting a lighting effect from a plurality of lighting effects and an effect level;
    updating, by the electronic device, information on the at least one category of the plurality of IoT light devices based on the lighting effect, the effect level and the brightness information; and
    obtaining, by the electronic device, an image of the at least one subject based on the updated information on the at least one category.

2. The method of claim 1, wherein the camera application is launched in an IoT photo mode.

3. The method of claim 1, wherein the at least one category comprises at least one of a key light category, a fill light category, and a back light category.

4. The method of claim 1, wherein identifying the brightness information of each IoT light device comprises:
    identifying, by the electronic device, the at least one subject in a field of view of at least one image sensor associated with the camera application;
    identifying, by the electronic device, a distance of the at least one subject from the at least one image sensor;
    identifying, by the electronic device, each of the plurality of IoT light devices that illuminate light on the at least one subject in the field of view of the at least one image sensor;
    identifying, by the electronic device, a distance of each IoT light device that illuminate light on the at least one subject from the at least one image sensor and the at least one subject;
    identifying, by the electronic device, a direction of each IoT light device that illuminate light on the at least one subject with respect to the at least one image sensor and with respect to the at least one subject;
    obtaining, by the electronic device, a pre-defined maximum brightness level of each IoT light device of the plurality of IoT light devices; and
    identifying by the electronic device, an effective brightness level of each IoT light device that illuminate light on the at least one subject, and
    wherein the brightness information of each IoT light device that illuminates light on the at least one subject comprises the effective brightness level of each IoT light device that illuminates light on the at least one subject.

5. The method of claim 4, wherein categorizing the plurality of IoT light devices into the at least one category comprises:
    categorizing, by the electronic device, a first set of IoT light devices present behind the at least one subject as back lights based on the identified direction of each IoT light device and the identified distance of each IoT light device of the plurality of IoT light devices;
    categorizing, by the electronic device, remaining IoT light devices of the plurality of IoT light devices in a second set of IoT light devices and a third set of IoT light devices, wherein the second set of IoT light devices and the third set of IoT light devices are in front of the at least one subject, and wherein the second set of IoT light devices are positioned opposite to the third set of IoT light devices;
    identifying, by the electronic device, a maximum cumulative effective brightness of the second set of IoT light devices and a maximum cumulative effective brightness of the third set of IoT light devices;
    identifying, by the electronic device, whether a difference between the maximum cumulative effective brightness of the second set and the maximum cumulative effective brightness of the third set is greater than a threshold difference; and
    performing, by the electronic device, one of:
        categorizing, the second set of IoT light device as key lights and the third set of IoT light device as fill lights in response to identifying that the difference between the maximum cumulative effective brightness of the second set and the maximum cumulative effective brightness of the third set is greater than the threshold difference, wherein the maximum cumulative effective brightness of the second set is greater than the maximum cumulative effective brightness of the third set, or
        categorizing, the second set of IoT light device as key lights and the third set of IoT light device as fill lights in response to identifying that the difference between the maximum cumulative effective brightness of the second set and the maximum cumulative effective brightness of the third set is less than the threshold difference, and wherein the at least one subject is facing towards the second set of IoT lights.

6. The method of claim 1, wherein receiving the user input comprises:

displaying a plurality of lightning effects in a field of view of at least one imaging sensor of the electronic device; and identifying a desired lightning effect from the plurality of lightning effects selected by a user of the electronic device, wherein each lighting effect from the plurality of lighting effects has different ratios of brightness of each category of IoT lights.

7. The method of claim 1, further comprising:

transmitting, by the electronic device, a control command to each IoT light device in the at least one category of the IoT light devices, wherein the control command comprises values corresponding to a desired brightness level of the at least one category;

receiving, by each IoT light device in the at least one category, the control command from the electronic device; and applying the control command to each IoT device in the at least one category to achieve the desired brightness level of the at least one category.

8. The method as claimed claim 1, wherein the plurality of IoT light devices are in communication with the electronic device over a common network.

9. The method of claim 1, further comprising:

identifying, by the electronic device, at least one of a change in a position of the at least one subject, and a change in position of an image sensor associated with the camera application of the electronic device; and re-configuring, by the electronic device, the at least one category of IoT light devices based on the identified at least one of the change in the position of the at least one subject and the change in position of the image sensor.

10. An electronic device, comprising:

a memory storing instructions;
a processor; and
a communicator;
wherein the processor is configured execute the instructions to:
launch a camera application,
identify brightness information corresponding to a plurality of Internet of Things (IoT) light devices;
categorize the plurality of IoT light devices into at least one category based on a maximum brightness level included in the brightness information of each IoT light device of the plurality of IoT light devices and location information of each IoT light device of the plurality of IoT light devices with respect to a location of a camera and with respect to a face of at least one subject;
receive a user input selecting a lighting effect from a plurality of lighting effects and an effect level;
update information on the at least one category of the plurality of IoT light devices based on the lighting effect, the effect level and the brightness information; and
obtain an image of the at least one subject based on the updated information on the at least one category.

11. The electronic device of claim 10, wherein the processor is further configured execute the instructions to launch the camera application to obtain the image of the at least one subject in an IoT photo mode, and wherein the IoT photo mode configures the electronic device to achieve a desired brightness level of the at least one category.

12. The electronic device of claim 10, wherein the at least one category comprises at least one of a key light category, a fill light category, and a back light category.

13. The electronic device of claim 10, wherein the processor is further configured to execute the instructions to:

identify the at least one subject in a field of view of at least one image sensor associated with the camera application;

identify a distance of the at least one subject from the at least one image sensor of the electronic device;

identify each of the plurality of IoT light devices that illuminate light on the at least one subject in the field of view of the at least one image sensor;

identify a distance of each IoT light device that illuminates light on the at least one subject and a direction of each IoT light device with respect to the at least one image sensor and with respect to the at least one subject;

obtain a pre-defined maximum brightness level of each IoT light device that illuminate light on the at least on subject; and identify an effective brightness level of each IoT light device that illuminate light on the at least one subject.

14. A method, comprising:

identifying, by an electronic device, brightness information corresponding to a plurality of light devices and location information corresponding to the plurality of light devices;

categorizing, by the electronic device, the plurality of light devices into at least one category based on a maximum brightness level included in the brightness information and the location information with respect to a location of a camera and with respect to a face of at least one subject;

updating, by the electronic device, information on the at least one category based on a lighting effect, an effect level of the lighting effect, and the brightness information; and obtaining, by the electronic device, an image of the at least one subject based on the updated information of the at least one category.

15. The method of claim 14, wherein the at least one category comprises at least one of a key light category, a fill light category, and a back light category.

16. The method of claim 14, further comprising:

transmitting, by the electronic device, a control command to each of the plurality of light devices categorized in the at least one category, the control command comprising values corresponding to a brightness level of the at least one category, wherein each of the plurality of light devices applies the control command to output the brightness level.

17. The method of claim 14, further comprising:

identifying, by the electronic device, a change of a position of the at least one subject; and re-configuring, by the electronic device, the at least one category of light devices based on the identified change of position of the at least one subject.

* * * * *